May 2, 1950  B. F. ARPS  2,506,008
HYDRAULIC CONTROL VALVE
Filed Jan. 17, 1947  5 Sheets-Sheet 1
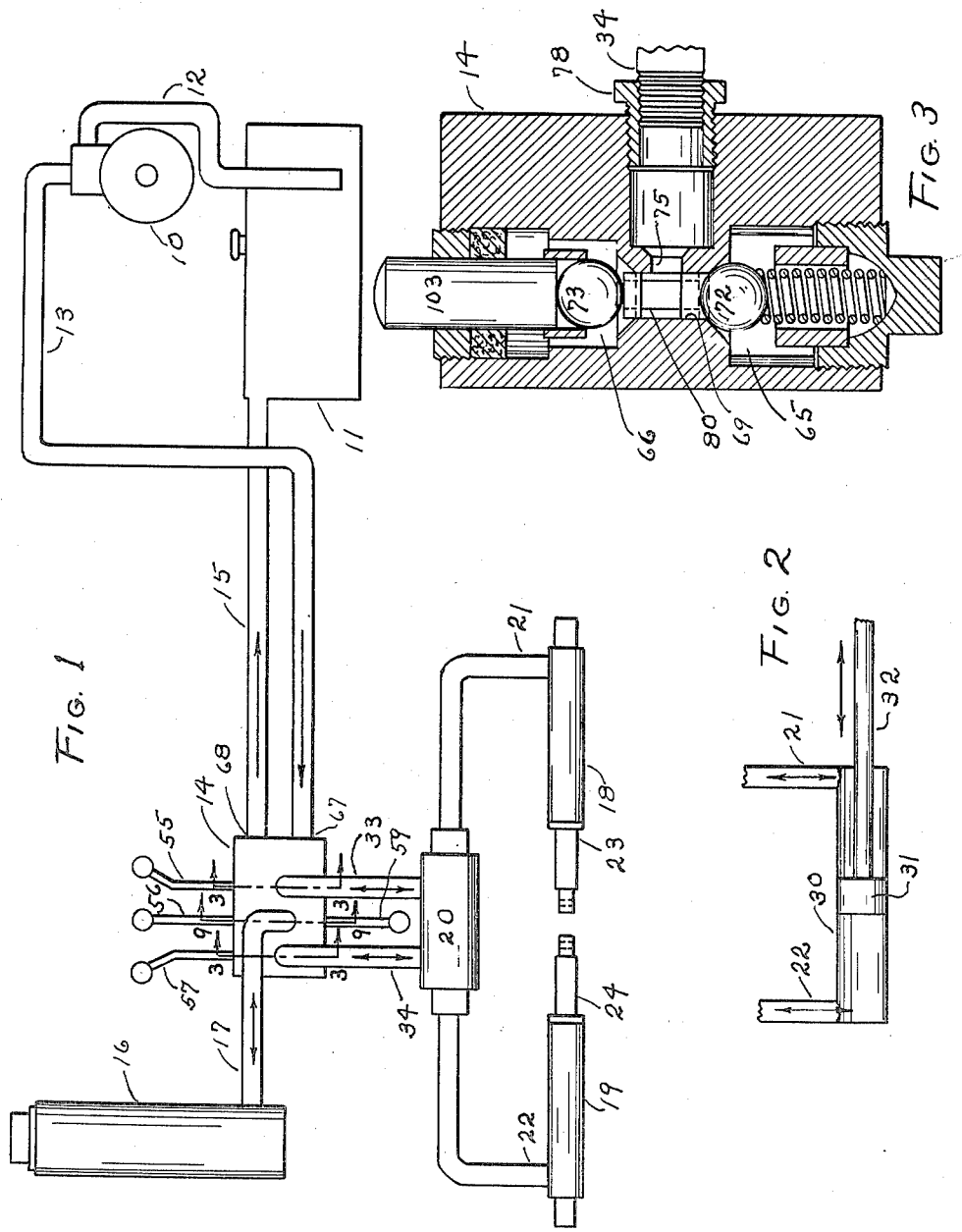
INVENTOR.
BRUNO F. ARPS
BY  a. Strob
ATTORNEY May 2, 1950 B. F. ARPS 2,506,008
HYDRAULIC CONTROL VALVE
Filed Jan. 17, 1947 5 Sheets-Sheet 3

INVENTOR.
BRUNO F. ARPS
BY
ATTORNEY

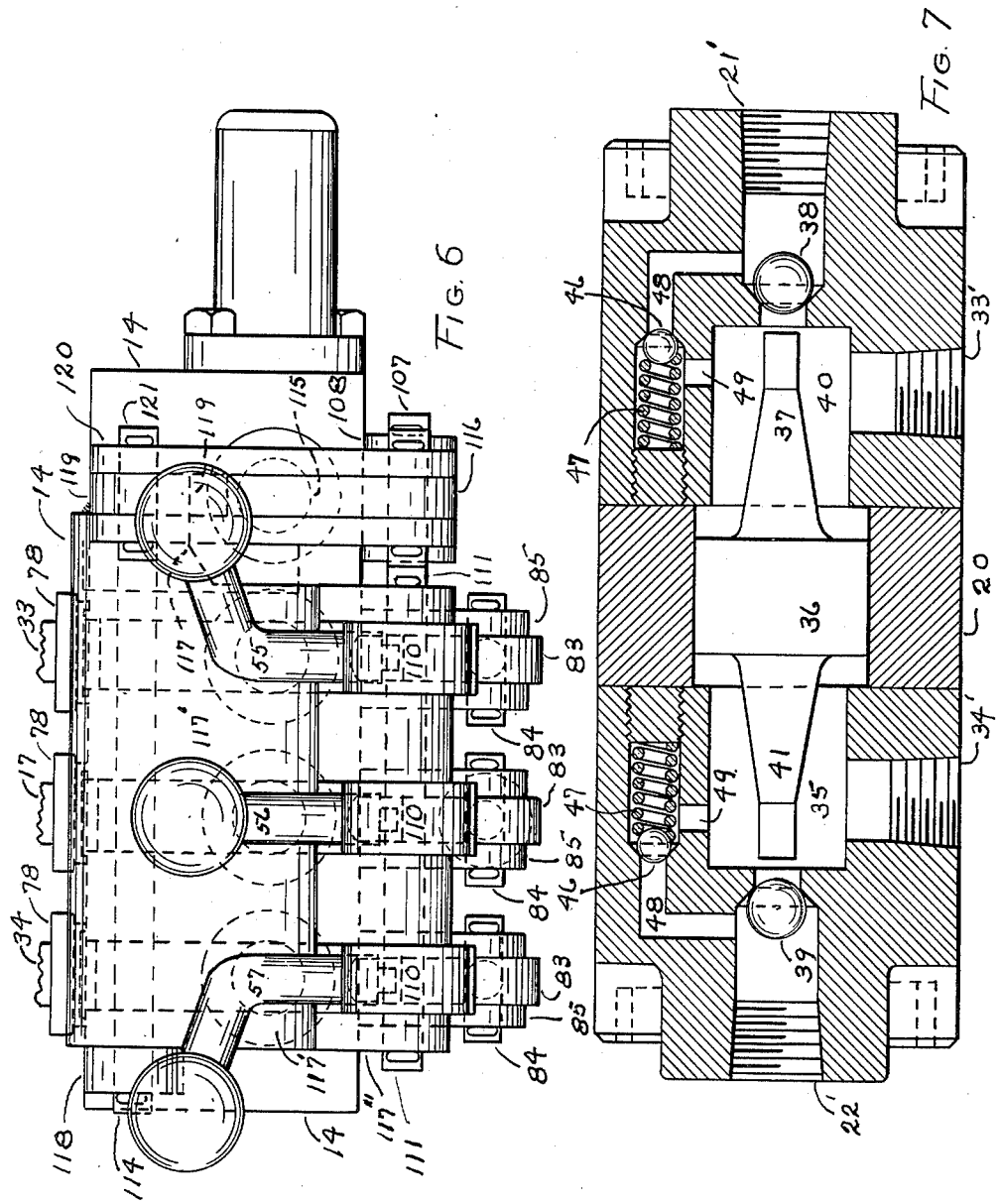

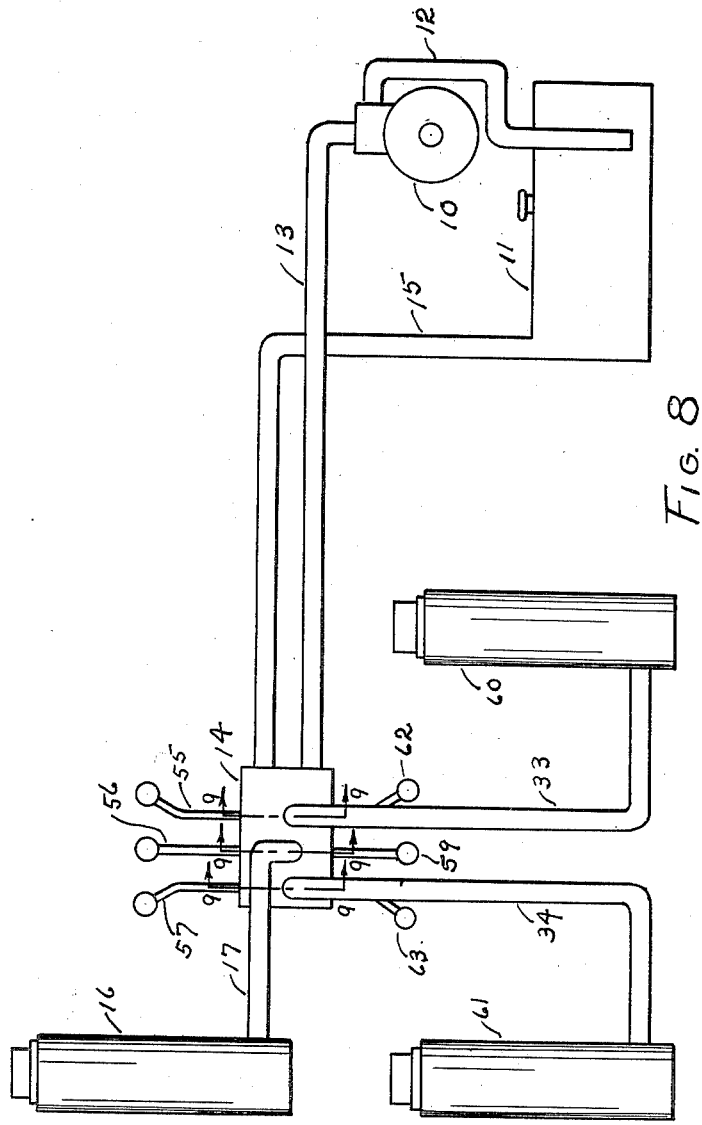

Patented May 2, 1950

2,506,008

UNITED STATES PATENT OFFICE 2,506,008

HYDRAULIC CONTROL VALVE

Bruno F. Arps, New Holstein, Wis.

Application January 17, 1947, Serial No. 722,613

5 Claims. (Cl. 60—97)

The present invention relates to means for controlling the operations of one or more hydraulically operated rams, the controlling means comprising a valve box or boxes having a number of ball valves and means for controlling the valves manually whereby the rams may be operated simultaneously or individually, the valve box having connections to a hydraulic pump and a sump.

The principal objects of the present invention are to provide a compact valve box which can be located within reach of the operator and can be manufactured at low cost, is simple and efficient.

A further object of the present invention is to preferably use ball check valves only, instead of slide or poppet valves, thus to simplify the machining operations of the device and provide an assembly which can be easily disassembled, cleaned and reassembled.

Objects of the present invention are to provide a device having a primary inlet and a primary outlet and provide two closely spaced ports in parallel relation connected thereto with ball check valves therebetween and means to block off oil passageways from one to the other and through rams except as determined by the movement of manually controlled levers or an automatic regulator.

Other objects of the present invention are to provide a design in which two mechanically connected rams or a double acting ram may be controlled independently or simultaneously with other rams.

In the present invention means are provided whereby when the inlet to a single acting ram or a double acting ram is closed the ram or piston will be locked into position. The present invention is particularly adapted for use on a loading attachment for tractors as illustrated in Patent No. 2,391,857, January 1, 1946.

To these and other useful ends my invention consists of parts, combinations of parts or their equivalents and mode of operation as hereinafter described and claimed and shown in the accompanying drawings in which:

Fig. 1 is a diagrammatic drawing illustrating my preferred design, showing the valve box as viewed from the rear, also the regulator and connections to the rams, pump and oil sump.

Fig. 2 illustrates diagrammatically a double acting ram which may take the place of the two single acting rams which are now shown as connected to the regulator in Figure 1.

Fig. 3 is a sectional view of the valve box, taken on lines 3—3 of Figure 1.

Fig. 6 is a top view of the valve box as shown in Figures 4 and 5.

Fig. 7 is a sectional view of the regulator.

Fig. 8 is a diagrammatic drawing of a modification as viewed from the rear wherein the device is adapted to operate single acting rams only.

Figure 4:
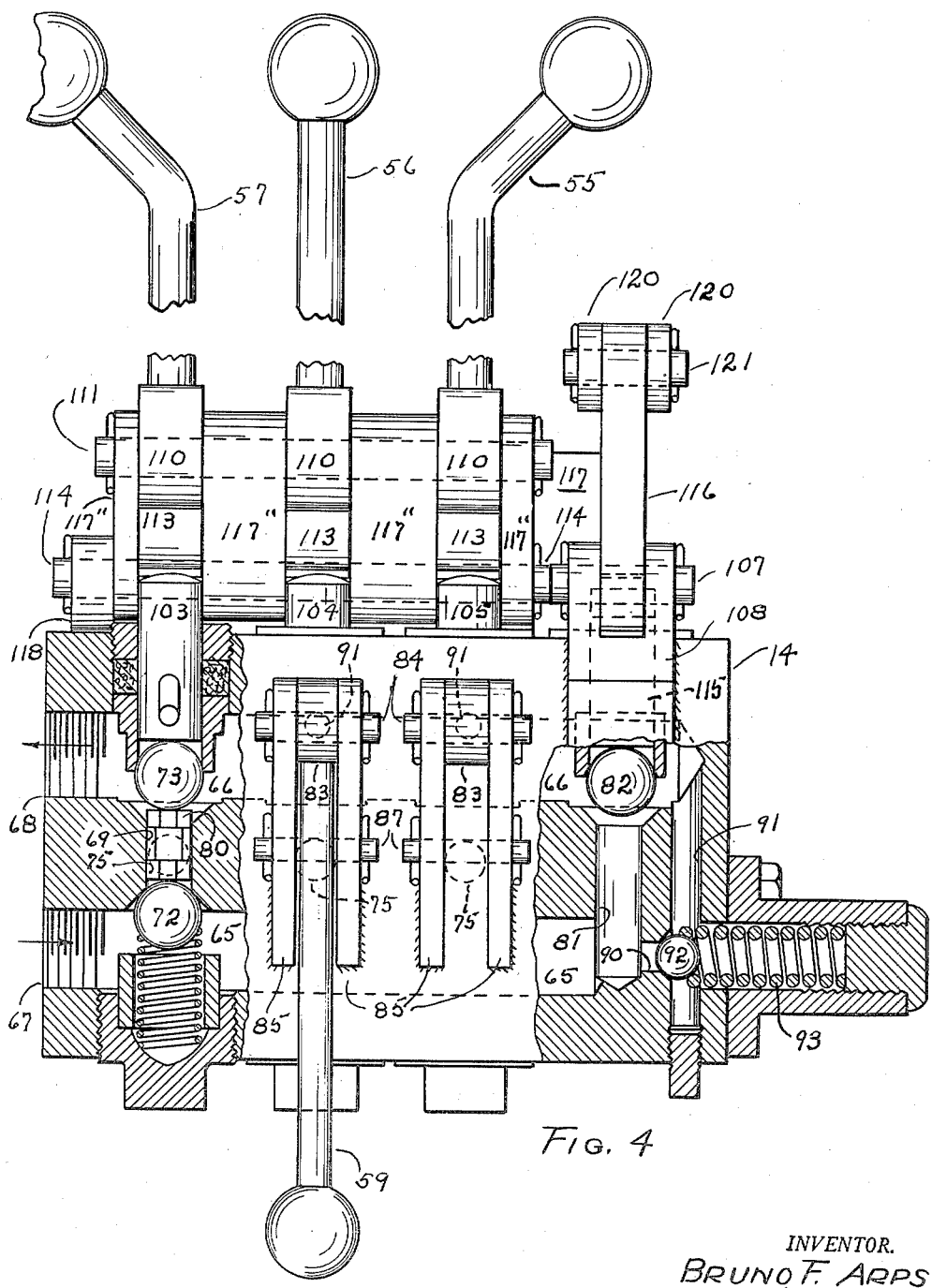
Fig. 4 is a partially sectioned front view of the valve box less the regulator shown in Figure 3.

It will be understood that the valve box may be designed so the outlet and inlet pipes may be at the other end of the box from that shown in Figures 1 and 8.

My regulator is adapted to automatically drain the end of the double acting cylinder toward which the piston is moving, or to drain one of two single acting rams when their pistons are mechanically connected together and when the other ram is being extended.

My regulator may be mounted within the main valve box so there is but one unit or it may be separate unit as shown in Figure 1. In Figures 1 and 8 the hydraulic pump is designated by reference numeral 10, the sump by reference numeral 11, the pump having a suction pipe 12 from the bottom of the sump and a delivery pipe 13 which leads to the valve box 14, the valve box having a return pipe 15 which leads into the sump 11. In Figure 1, a single acting ram 16 is shown as operatively connected to valve box 14 by pipe 34.

I illustrate two single acting rams 18 and 19 having pipe connections 21 and 22 to regulator 20. The pistons 23 and 24 of these rams are mechanically connected together (not shown) so they are forced to move in opposite directions. It will be understood that the pistons of rams 18 and 19 are shown in their medial positions.

In Figure 2, I illustrate a double acting ram 30 as a substitute for rams 18 and 19, having a piston 31 and a piston rod 32, the ends of the cylinder of this ram having pipe connections 21 and 22 adapted to be connected to regulator 20 and the regulator having pipe connections 33 and 34 to the valve box 14.

Referring now to Figure 7. Pipes 33 and 34 form connections to thread inlets 33' and 34' and pipes 21 and 22 form connections to thread inlets 21' and 22'. Thus for example if pressure is supplied to chamber 35 for extending piston 24 piston 36 will be moved to the right and projection 37 will lift ball 38 from its seat thus permitting piston 23 to retract while ram 19 is extending.

If however pressure is supplied to chamber 40 from pipe 33, piston 36 will be moved to the left and projection 41 will lift valve 39 from its seat permitting piston 24 to retract while piston 23 is extending. Clearly a double acting ram as in Figure 2 will act in the same manner. When either piston is retracting, oil wil flow to valve box 14 and to the sump through either pipe 33 or 34, as will hereinafter appear.

The present invention is particularly adapted for operating the device as shown in Patent #2,391,857, January 1, 1946, B. F. Arps et al. Clearly this device has considerable weight, and while moving the platform rapidly in one direction or the other if the valve supplying the operating pressure to a ram is shut or opened suddenly or for any other reason excessive pressure is created in a retracting or extending ram, means are provided for cushioning this action as follows:

Valves 46—46 are held on their seats by means of springs 47—47, each valve having ports 48—48 which lead to pipes 21 and 22, springs 47 being heavy enough to hold valves 46 on their seats against normal operating pressure. However a serious increase in pressure will raise either of these valves, thus to release the pressure and protect the device against injury by permitting the released oil to flow into either chamber 35 or 40 through outlets 49.

I will now describe my valve and port system in valve box 14 and refer to Figures 1, 3, 4, 5, 6 and 9. I provide two ducts 65 and 66 (see Figure 4) which are closely spaced in parallel relation having inlets and outlets as at 67 and 68 into which pipes 13 and 15 are secured respectively, as illustrated in Figures 1 and 2. Ducts 65 and 66 have therebetween, three spaced openings 69, 70 and 71 (71 not shown), one for each extending lever 55, 56 and 57. Each opening is shaped for seating a ball 72 and 73. Balls 72 are spring held on their seats as illustrated and balls 73 are adapted to be seated by an extending lever as will hereinafter appear.

Each opening 69, 70 and 71 is provided near its center with an outlet port 75. The center outlet port has a ball 76 (see Figure 9) which is held on its seat by means of a spring 77, the spring being held in position by means of a fitting 78. This fitting is screw threaded or otherwise adapted to receive pipes 17, 33 and 34. The two end outlets 75 have no balls or springs (see Figure 3), therefore there is a direct outlet from pipes 33 or 34 to duct 66 when a ball 73 is off its seat as illustrated in Figure 3. I provide a passageway 81 (see Figure 4) between ducts 65 and 66, having a ball valve 82 adapted to be seated on the upper end of this passageway as will hereinafter appear.

Figures 5, 9:
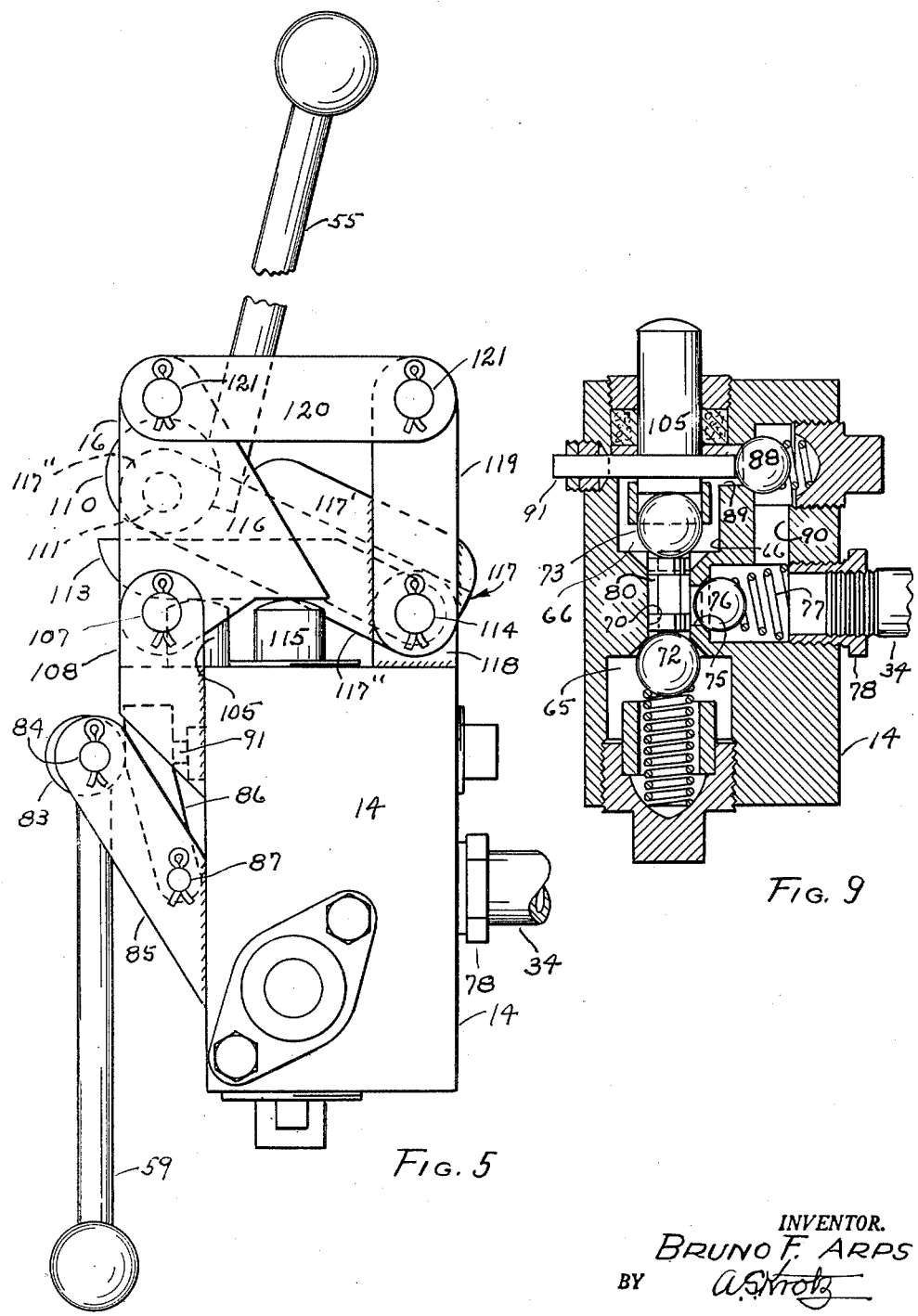
Fig. 5 is an end view of the valve box shown in Figure 1, less the regulator.
Fig. 9 is a section taken on lines 9—9 of Figures 1 and 8.

Each opening 69, 70 and 71 has slidably mounted therein a skeleton piston 80 having a length adapted to hold one of the balls from its seat when the other ball is seated (see Figures 3, 4 and 9). Thus for example when center lever 56 is pulled and its ball 73 and ball 82 are forced on their seats, ball 72 will be forced from its seat and oil may pass from duct 65 into pipe 17 by lifting ball 76 thus to extend ram 16. I provide means for retracting ram 16 as follows:

A lever 59 (see Figure 5) has secured thereto a cam 83 which is pivotly mounted on a shaft 84 the shaft being mounted on brackets 85 which are preferably electric welded to valve box 14. I hingedly mount a lever 86 on brackets 85 by means of a shaft 87. A ball 88 (see Figure 9) is spring held on a port 89, this port having an outlet into duct 66. The inlet chamber of ball 88 is connected to the outlet chamber of ball 76 by means of a port 90.

I provide a plunger 91 which rests on ball 88 at one end and is adapted to loosely contact lever 86 at the other end. Thus it will be seen that by pulling lever 59 cam 83 will move plunger 91 to the right and lift ball 88, whereby oil may flow from ram 16 through pipe 17 and through ports 89 and 90 into duct 66 thus permitting ram 16 to retract.

It will be understood that ram 16 is caused to retract by the weight it is adapted to lift.

For example by pulling lever 55 to the left from the position shown in Figure 5 associate balls 73 and 82 will be seated and associate ball 72 will be lifted as already outlined, oil will then be caused to flow into pipe 34 (see Figure 9) for extending ram 16, and when, for example, lever 57 is pulled balls 73 and 82 will be seated and ball 72 lifted and cause oil to flow into pipe 34 thus to extend ram 19 as already recited. Levers 55, 56 and 57 are therefore adapted to extend their respective rams and regulator 20 will permit the other ram of the pair of rams to retract.

It will be seen that the rams may be extended and retracted by manipulating the levers as outlined, that either ram 18 and 19 are retracted only by extending the other ram, therefore each of the three rams are under complete manual control and may be fully extended, retracted or stopped in any medial position. It will be noted that when either ram 18 or 19 is not being extended balls 38 and 39 will seat and prevent either ram from retracting. Thus clearly there are but four levers used in the design shown in Figure 1, regulator 20 acting to permit retracting of either of the mechanically connected rams. In Figure 8 there are shown three single acting rams marked as 16, 60 and 61, each ram 60 and 61 being retractable by means of levers 62 or 63 as already described in connection with Figures 1 and 9.

For every single acting ram associated with a valve box, the valves and ports will be as shown in Figure 9. For every double acting ram as shown in Figure 2, the valve arrangement is, as shown in Figure 3. Clearly therefore any number of single acting rams may be served as in Figures 1 and 9 and double acting, or pairs of single acting rams may be served as shown in Figures 1, 2 and 3.

All of the connections between the levers and their ball valves which bring about the action of rams as already described will now be explained.

Three plungers 103, 104 and 105 (see Figures 4 and 5) are each adapted to rest on a ball 73 which are normally held from their seats by balls 72 and pistons 80.

Levers 55, 56 and 57 are each secured to a cam 110 which is rotatably mounted on the free end of member 117 by means of a shaft 111 (see Figures 4 and 5). Clearly when an extending lever is pulled in a counterclockwise direction about shaft 111 for extending a ram, a member 103, 104, or 105 and a member 115 (see Figures 4 and 5) will be moved downward for the following reasons:

Numeral 117 designates the extending lever carrying member in its entirety and comprises a transverse plate 117' having integrally formed spaced depending flanges 117'' on the front ends of which cams are pivoted and between which levers 113 lie. Members 113 and 117'' are pivoted at their rear ends to valve box 14 by means of shaft 114 which is supported at its ends by posts 118—118. A member 116 is pivoted at its lower left corner to valve box 14 by means of a shaft 107 and post 108 (see Figures 4 and 5). The shape of member 116 is clearly shown in Figure 5. A link 119 is secured preferably by electric welding to member 117. The upper ends of 119 and 116 are hingedly connected by means of links 120 and bolts 121—121. Thus when an extending lever is pulled, its cam 110 will act to move an associate lever 113 down and its associate plunger down (either 103, 104 or 105) and also turn member 116 clockwise so as to move associate plunger 115 down thus to extend the ram by closing ball valve 82 as already outlined.

Levers 55, 56 and 57 are each welded to separate cams 110. These cams are rotatably mounted on shaft 111, which in turn is mounted on the free ends 117", of members 117. Members 117 and 117' are welded to member 119 which is rotatably mounted on shaft 114.

Observing Figure 5, it will be seen that when lever 55 is pulled to the left, the cam will force lever 113 downward thus pushing plunger 105 downward. At the same time members 117 will be forced to rise thus forcing member 119 to swing to the right about shaft 114 as an axis and therefore also links 120 will move to the right. Member 116 will then swing to the right about shaft 107 as an axis thus forcing plunger 115 downward. Therefore either one of the three levers when pulled, will force its associated plunger downward and in each event plunger 115 will be forced downward.

It will be seen that anyone of the rams may be extended by pulling its extending lever and that by pulling the retracting lever (if a ram is extended) it will be permitted to retract and that in the case of a pair of regulator served rams, either ram may be extended by pulling its extending lever at which time the other ram because of the action of piston 36, will be permitted to retract automatically. Clearly a double acting ram as in Figure 2 may take the place of the pair of mechanically connected rams as in Figure 1.

It will be seen that passage of oil from duct 65 to duct 66 may flow freely so long as an extending lever is not in an operating position and that when an extending lever is in an operating position its ram will be extended because this free flow is shut off by ball 82. Furthermore if, for example, an extending ram becomes clogged or stalled suddenly for any reason, excessive oil pressure in duct 65 will be prevented by ball 92 which is held on the seat of port 90 by spring 93, permitting oil to flow into port 66 through ports 90 and 91. It will also be noted that there will be a short period of free flow of oil or other fluid being used, between ducts 65 and 66 before an extending valve is fully seated, thus to prevent momentary peak or erratic oil pressure.

I claim:

1. A device of the character described comprising in combination, a source of oil pressure, a single acting ram, a pair of single acting rams mechanically connected together for simultaneous movement in opposite directions, a valve box and a regulator, inlet and outlet passageways in said valve box having operating connections with said source of oil pressure, a normally open passageway between said inlet and outlet passageways, three other passageways between said inlet and outlet passageways, each having valve seats at their ends, the seats on the inlet ends of the three passageways having spring held ball check valves, skeleton pistons in said three other passageways, ball valves at the outlet end of said three other passageways, said pistons having a length whereby when the spring held valves are seated the other valves must be open, two of said three passageways having operating connections intermediate their ends to said regulator, operating connections from said regulator to said pair of rams, the other of the three passageways having a spring held outlet check valve intermediate its ends with an operating connection to said single acting ram, an outlet connection from the outlet of said outlet check valve to said outlet passageway having a spring held check valve therein for automatically closing the connection, three extending levers each having means to close said free passageway when operated to extend its ram by closing its outlet valve, a retracting lever mounted on said valve box, means whereby said single acting ram may be permitted to retract by opening said last mentioned spring held check valve, said regulator having means whereby when one of said pairs of rams is extended said regulator will act to form a free passageway from the retracting ram to said outlet passageway.

2. A device as recited in claim 1 including, spring held valves having ports forming an outlet from the connection to each pair of rams adapted to release excessive pressure that may be caused by a sudden closing of the extending means of one of the pair of rams.

3. A device of the character described comprising in combination, a source of oil pressure, a pair of single acting rams mechanically connected together for simultaneous movement in opposite directions, a valve box and a regulator, inlet and outlet passageways in said valve box having operating connections to said source of oil preessure, a normally open passageway between said inlet and outlet passageways, two other passageways between said inlet and outlet passageways, each having valve seats at their ends, spring seated valves on the inlet end of said other passageways, skeleton pistons in said other passageways, valves at the outlet end of said other passageways, said skeleton pistons having a length whereby when the spring held valves are seated, the other valves must be open, each said two other passageways having operating connections from intermediate their ends to the regulator, two extending levers mounted on said valve box, each having means to close said normally open passageway when they are operated to close their outlet valve to extend a ram, said regulator having means whereby when one of said pairs of rams is extended said regulator will act to form a free passageway from the other ram to said outlet passageway.

4. A device as recited in claim 3 including, spring held valves having ports forming an outlet from each ram to said regulator operating connection and adapted to release excessive pressure in the ram that may be caused by a sudden closing of the extending means of a ram.

5. A device of the character described comprising in combination, a source of oil pressure, a double acting ram, a valve box, inlet and outlet passageways in said valve box having operating connections to said source of oil pressure, a normally open passageway between said inlet and outlet passageways, two other passageways between said inlet and outlet passageways, each having valve seats at their ends and skeleton pistons therein, spring seated valves on the inlet end of said other passageways, valves at the outlet end of said other passageways, said skeleton pistons having a length whereby when a spring held valve is seated, its other valve must be open, each said two other passageways having operating connections from intermediate their ends to said regulator, operating connections from said regulator to opposite ends of said double acting ram, two extending levers mounted on said valve box, each having means to simultaneously close said normally open passageway and seat their associate outlet valve for extending a ram, said regulator having means whereby when the piston of said double acting ram is moved in one direction, the regulator will act to form a free oil passageway from the end of the ram toward which the piston is traveling.

BRUNO F. ARPS.

REFERENCES CITED

The following references are of record in the file of this patent:

UNITED STATES PATENTS

| Number | Name | Date |
|---|---|---|
| 1,955,154 | Temple | Apr. 17, 1934 |
| 1,968,422 | Proctor | July 31, 1934 |
| 2,094,466 | Proctor | Sept. 28, 1937 |
| 2,247,141 | Twyman | June 24, 1941 |
| 2,362,262 | French | Nov. 7, 1944 |
| 2,410,978 | Kelly | Nov. 12, 1946 |
| 2,416,373 | Brown | Feb. 25, 1947 |
| 2,431,944 | Lauck et al. | Dec. 2, 1947 |